(12) United States Patent
Qiu et al.

(10) Patent No.: US 7,990,166 B2
(45) Date of Patent: Aug. 2, 2011

(54) TESTING MODULE FOR TESTING KEY BUTTONS OF PORTABLE ELECTRONIC DEVICE

(75) Inventors: San-Ping Qiu, Shenzhen (CN); Gao-Xiong Li, Shenzhen (CN); Ren-Zhong Wei, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 64 days.

(21) Appl. No.: 12/475,675

(22) Filed: Jun. 1, 2009

(65) Prior Publication Data

US 2010/0019792 A1   Jan. 28, 2010

(30) Foreign Application Priority Data

Jul. 25, 2008   (CN) .......................... 2008 1 0303063

(51) Int. Cl.
*G01R 31/20* (2006.01)
*G01R 1/067* (2006.01)
*G01R 31/00* (2006.01)

(52) U.S. Cl. ......... 324/754.12; 324/754.14; 324/754.15; 324/755.05

(58) Field of Classification Search ............. 324/754.12, 324/754.14, 754.15, 755.05
See application file for complete search history.

(56) References Cited

U.S. PATENT DOCUMENTS

| 4,707,655 A | * | 11/1987 | Kruger ..................... 324/755.01 |
| 5,189,364 A | * | 2/1993 | Kazama .................... 324/755.05 |
| 5,762,504 A | * | 6/1998 | Itoh ................................. 439/66 |
| 6,655,983 B1 | * | 12/2003 | Ishikawa et al. ............. 439/482 |
| 2007/0018666 A1 | * | 1/2007 | Barabi et al. .................. 324/761 |

* cited by examiner

*Primary Examiner* — Roberto Velez
(74) *Attorney, Agent, or Firm* — Steven M. Reiss

(57) ABSTRACT

A testing module is provided including a driving assembly, a positioning assembly and a testing head mechanism. The positioning assembly positions the driving assembly and the testing head mechanism therein. The positioning assembly includes a positioning member. The positioning member includes a base seat. The base seat defines a receiving cavity. The testing head mechanism includes a cushioning mechanism accommodated in the receiving cavity and driven by the driving assembly to move relative to the positioning assembly.

10 Claims, 4 Drawing Sheets

TESTING MODULE FOR TESTING KEY BUTTONS OF PORTABLE ELECTRONIC DEVICE

BACKGROUND

1. Technical Field

The present disclosure relates to testing modules, and particularly to a testing module for testing key buttons of portable electronic device.

2. Description of Related Art

Inputting devices for portable electronic devices (e.g., mobile phones) require to be repeatedly operated. Usual inputting devices such as keypads are provided with key buttons. Key buttons typically should be tested e.g., for proper contacting to the printed circuit board.

A typical testing apparatus includes a pressing block and a pneumatically-driven testing module. The pressing block press downwardly against the key buttons directly and rigidly (i.e., without using any buffering means) by the testing module. When done this way, the key buttons tend to be damaged.

Therefore, there is room for improvement within the art.

BRIEF DESCRIPTION OF THE DRAWINGS

Many aspects of the new housing and method for fabricating the same can be better understood with reference to the following drawings. The components in the drawings are not necessarily drawn to scale, the emphasis instead being placed upon clearly illustrating the principles of the new housing and method for fabricating the same. Moreover, in the drawings, like reference numerals designate corresponding parts throughout the several views.

DETAILED DESCRIPTION

Figure 1:
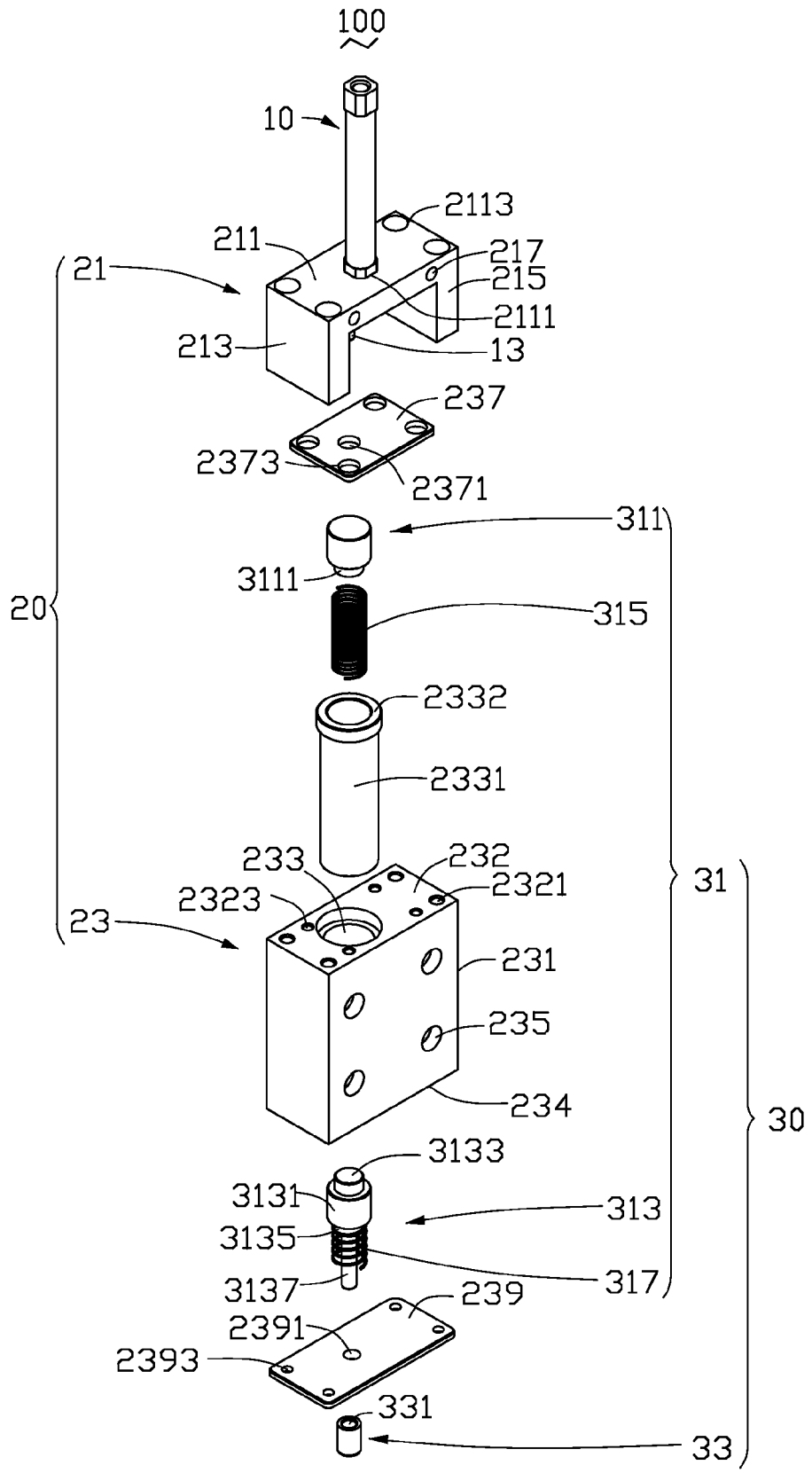
FIG. 1 is an exploded, isometric view of one embodiment of a testing module.

Exemplary testing modules 100 and 200 shown in FIGS. 1-3 and 4 can be suitably used for testing e.g., key buttons of keypads of mobile phones. The testing module 100 embodied in FIG. 1 includes a driving assembly 10, a positioning assembly 20, and a testing head mechanism 30. The positioning assembly 20 is configured for securing the driving assembly 10 and the testing head mechanism 30, and positioning the testing head mechanism 30 in alignment with e.g., one of the key buttons required to be tested.

The driving assembly 10 has and end connecting to a cylinder, and an opposite end (a stepped shaft portion) slidably engaged with the positioning assembly 20 for controlling movement of the testing head mechanism 30.

The positioning assembly 20 includes a positioning seat 21 and a positioning member 23. The positioning seat 21 includes a horizontal upper board 211, a vertical first side board 213 and a second side board 215. The upper board 211 defines a through positioning hole 2111 at the center and four through connecting holes 2113 at four corners. The connecting holes 2113 extend through the first side boards 213 and the second side board 215. The upper board 211 further defines two securing holes 217 along a direction nearly perpendicular to the positioning hole 2111.

The positioning member 23 includes a base seat 231, a first cover member 237 and a second cover member 239. The base seat 231 includes a first end portion 232 and an opposite second end portion 234. The base seat 231 defines a through, hollow and stepped cylindrical receiving cavity 233 for receiving an engagable and stepped cylindrical sleeve 2331. The sleeve 2331 forms an abutting end portion 2332 at one end. When being fully received in the receiving cavity 233, the abutting end portion 2332 abuts the stepped inner wall of the receiving cavity 233. The base seat 231 defines four fixing holes 235 in the side for facilitating the mounting of the positioning member 23 to a testing machine (not shown). The first end portion defines four blind, threaded holes 2321 and four mounting holes 2323.

The first cover member 237 defines a through first limiting holes 2371 at the center and four first attaching holes 2373 corresponding to the mounting holes 2323. The second cover member defines a second limiting hole 2391 at the center and four second attaching holes 2393.

The testing head mechanism 30 includes a cushioning mechanism 31 and a head cap 33. The cushioning mechanism 31 includes a first sliding column 311, a second sliding column 313, a first elastic member 315, a second elastic member 317. The first sliding column 311 has a first protrusion 3111 protruding downwardly from one end therefrom. The second sliding column 313 includes a base column 3131, a second protrusion 3133 on a side of the base column 3131, a first extending column 3135, and a second extending column 3137 on an opposing side of the base column 3131. The diameters of the base column 3131, the first extending column 3135, and the second extending column 3137 decrease, in order written. The first elastic member 315 can be coiled around the first protrusion 3111 and the second protrusion 3133. The second elastic member 317 can be coiled around the first extending column 3135 and the second extending column 3137 for resisting the base column 3131 and the second cover member 239.

The head cap 33 is provided with resiliency and has a blind hole 331 defined for securely receiving the second extending column 3137. Due to resiliency, the key button pressed by the head cap 33 can be protected from rigid striking.

Figure 2:
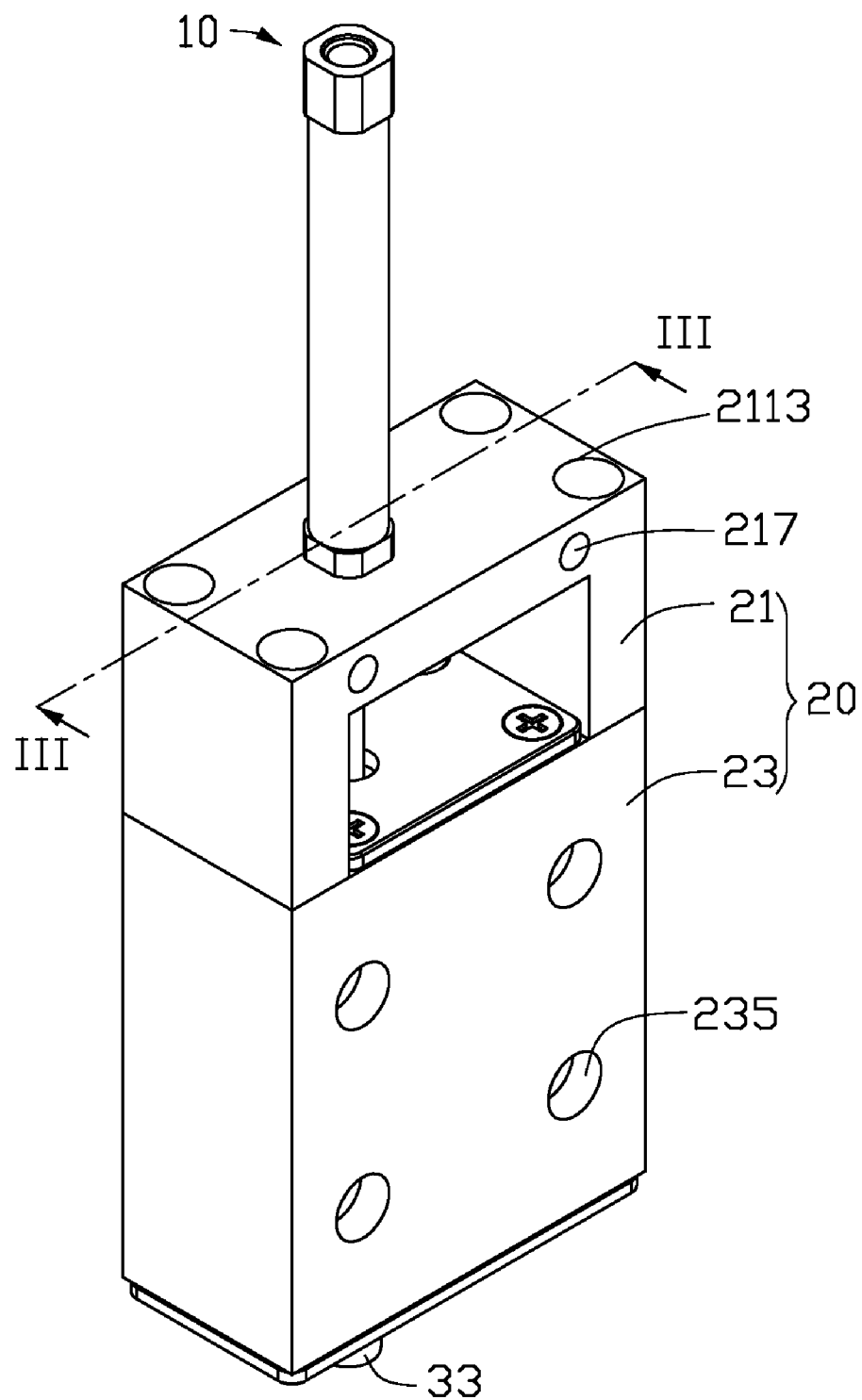
FIG. 2 is an assembled view of the testing module shown in FIG. 1.
Figure 3:
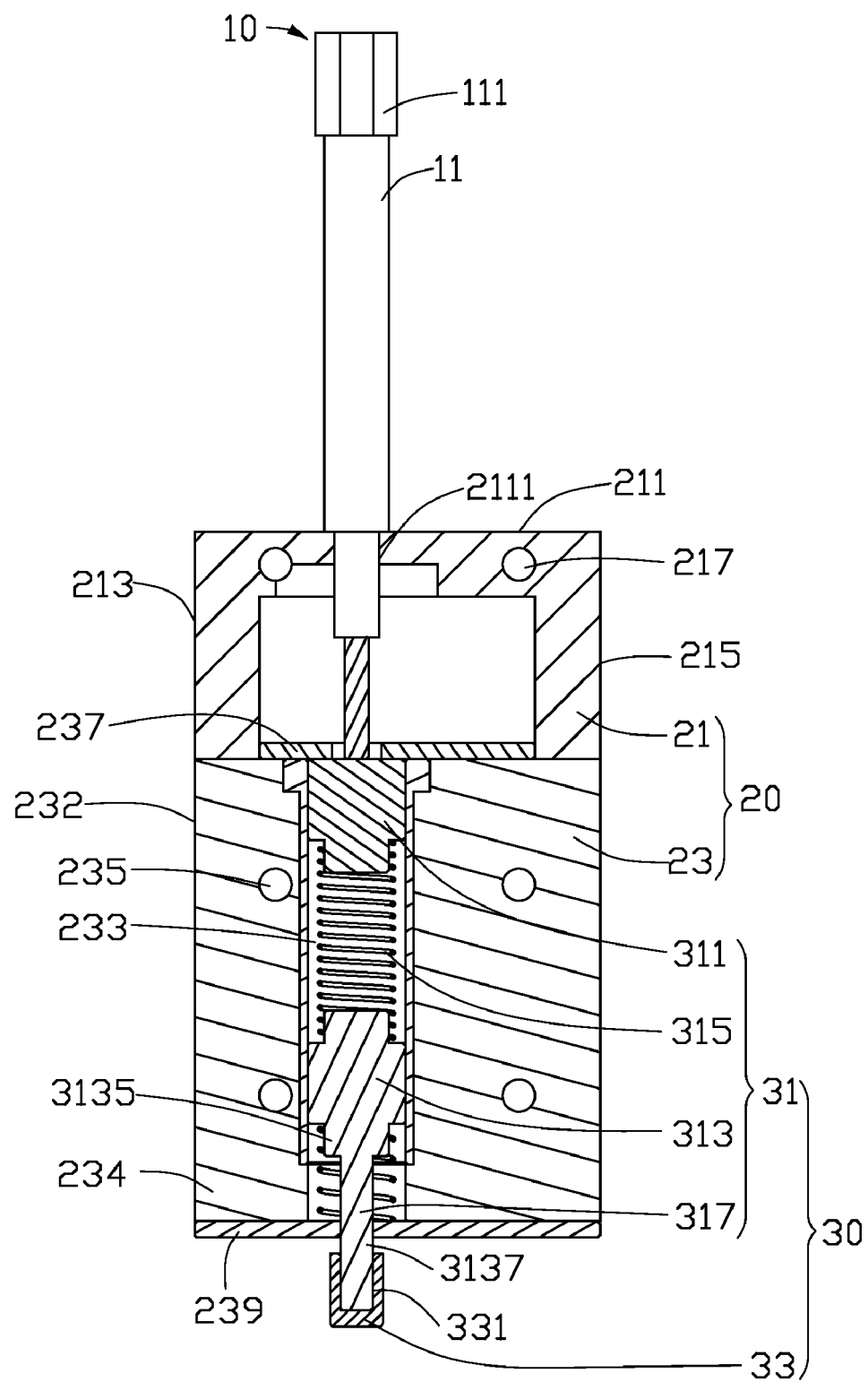
FIG. 3 is a cross sectional view of the testing module in FIG. 2 along line III-III.

Referring to FIGS. 2 and 3, during assembly, the second cover member 239 is fixed to the second end portion 234 by a fixing of screws into the mounting holes and the second attaching holes 2393. The second elastic member 317, the second sliding column 313, the first elastic member 315 and the first sliding column 311 can be mounted into the receiving cavity 233, in the order written. The second elastic member 317 resists the second cover member 239 and the base column 3131, and coils around the second extending column 3137 and the first extending column 3135. The first elastic member 315 resists the first sliding column 311. After that, the first cover member 237 can be fixed to the positioning member 23 by fixing screws into the first attaching holes 2373 and the mounting holes 2323. The positioning member 23 can be fixed to the positioning seat 21 by fixing screws into the connecting holes 2113 and the threaded holes 2321.

The assembled positioning assembly 20 can be mounted within the testing machine by the securing hole 217 and the fixing holes 235. The driving assembly 10 passes through the positioning hole 2111 and the first limiting holes 2371 to resist the first sliding column 311.

To test the key button, the driving assembly 10 moves downwardly to press the first sliding column 311 downwardly. During this course, the first elastic member 315 transmits the pressing force of the sliding column 311, enabling the head cap 33 to be forced to press the key button. In such case, the movement of the second sliding column 313 compresses the second elastic member 317. After above testing, once the driving assembly 10 is released, the second elastic member 317 returns to urge the first elastic member 315, first sliding column 311, and the second extending column 3137 to move reversely.

Figure 4:
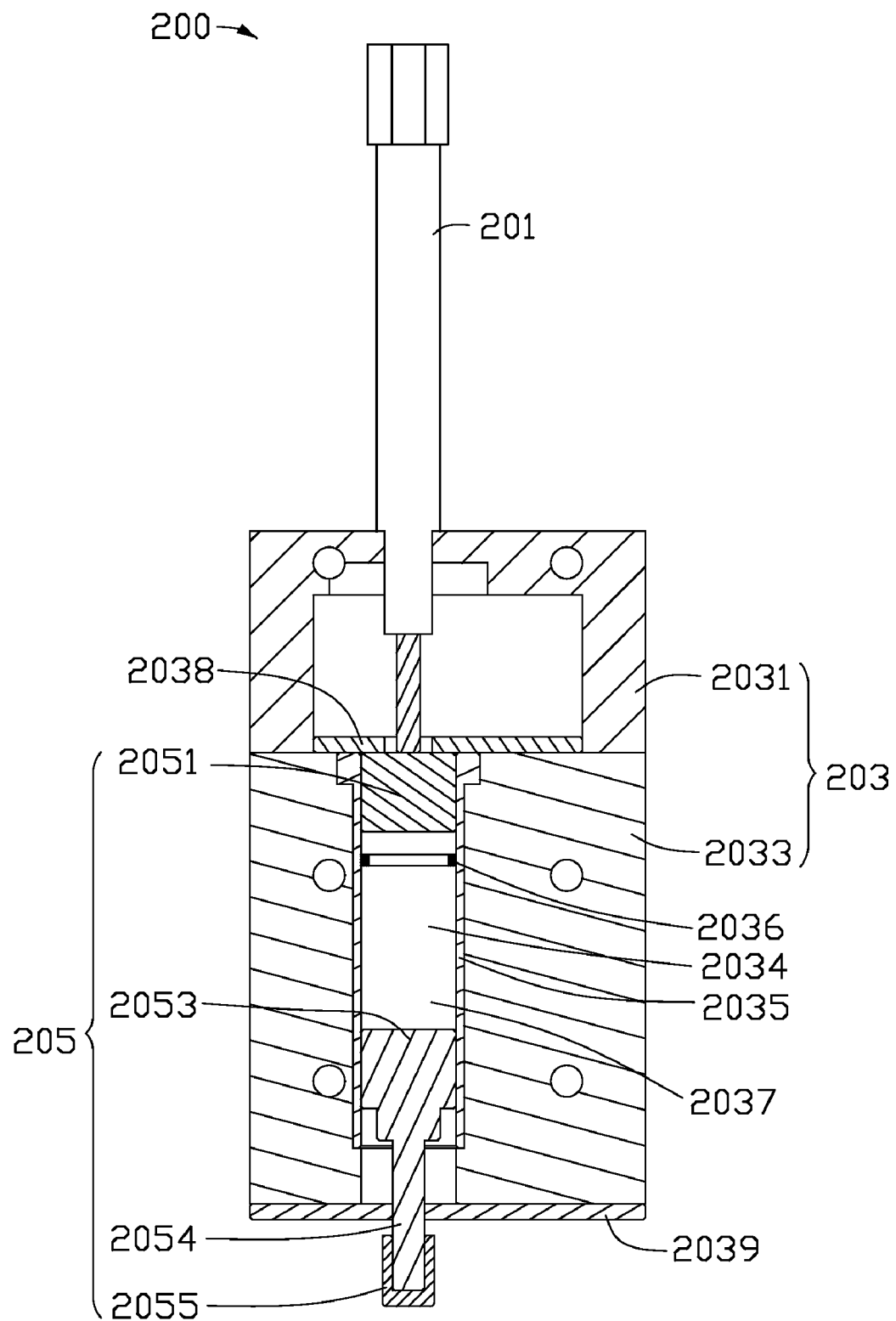
FIG. 4 is a cross sectional view of another embodiment of a testing module.

FIG. 4 shows another testing module 200 of another embodiment, which is structurally similar to the testing module 100, yet, replaces the cushioning mechanism 30 of the first embodiment. The testing module 200 includes a driving assembly 201, a positioning assembly 203 and a testing head mechanism 205. The positioning assembly 203 includes a positioning seat 2031 and a positioning member 2033. The positioning member 2033 defines a hollow stepped receiving cavity 2034. The positioning assembly 203 further includes a sleeve 2035 mounted into the receiving cavity 2034, and a first cover member 2038 and a second cover member 2039 secured to two opposite sides of the positioning member 2033. The interior wall of the sleeve 2035 forms a limiting ring 2036 for controlling pressure of the testing head mechanism 205 against the key button.

The testing head mechanism 205 includes a first sliding column 2051, a second sliding column 2053, and a head cap 2054. The first sliding column 2051 is securely connected to the driving assembly 201. The second sliding column 2053 protrudes an extending column 2055 for mounting the head cap 2054. The first sliding column 2051 and the second sliding column 2053 can be engagably received in the sleeve 2035 to seal a changeable sealed chamber 2037 therebetween. Gas can be filled into the sealed chamber 2037.

During testing, the driving assembly 201 can be pressed to move downwardly. In this course, the first sliding column 2051 moves along to compress the gas of the sealed chamber 2037. With the sealed chamber 2037 shortened, the gas pressure is accordingly leveled up to transmit the pressing force of the driving assembly 201, which moves the second sliding column 2053 downwardly. The head cap 2054 can be forced to press the key button. To prevent the key button from being pressed overly, when the first sliding column 2051 reaches to the limiting ring 2036, the first sliding column 2051 cannot move further by the resisting of the limiting ring 2036. After above testing, once the driving assembly 201 is released, the sealed chamber 2037 enlarges and the gas pressure to be lowered down to urge the second sliding column 2053, the first sliding column 2051 and the driving assembly 201 to move reversely.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A testing module for key buttons of portable electronic device, comprising:

a driving assembly;
a positioning assembly positioning the driving assembly, the positioning assembly comprising a positioning member, the positioning member comprising a base seat, the base seat defining a receiving cavity; and
a testing head mechanism positioned in the receiving cavity of the positioning assembly to abut an end portion of the driving assembly, the testing head mechanism comprising a cushioning mechanism and a head cap secured to the cushioning mechanism, the cushioning mechanism accommodated in the receiving cavity, during testing, the end portion of the driving assembly engaging in the receiving cavity, resisting against the cushioning mechanism to drive the cushioning mechanism and the head cap to move and press the key button.

2. The testing module as claimed in claim 1, wherein the positioning member further comprises a sleeve mounted into the receiving cavity, the cushioning mechanism mounted in the sleeve.

3. The testing module as claimed in claim 2, wherein the receiving cavity is hollow stepped, and the sleeve is stepped cylindrical and securely engages into the receiving cavity.

4. The testing module as claimed in claim 2, wherein the cushioning mechanism comprises a first sliding column and a second sliding column, the first sliding column and the second sliding column are engagably received in the sleeve to seal a changeable sealed chamber therebetween, and the sealed chamber is filled with gas.

5. The testing module as claimed in claim 2, wherein an interior wall of the sleeve forms a limiting ring configured for controlling pressing of the testing head mechanism.

6. The testing module as claimed in claim 1, wherein the positioning member further comprises a first cover member and a second cover member, the first cover member and the second cover member secured to the two opposite ends of the base seat, the cushioning mechanism comprises two ends resting against the first cover member and the second cover member, respectively.

7. The testing module as claimed in claim 6, wherein the cushioning mechanism comprises at least two sliding columns and at least one elastic member, and the at least one elastic member located between the at least two sliding columns.

8. The testing module as claimed in claim 7, wherein one of the at least two sliding columns forms an extending column extending through the second cover member, the head cap defines a blind hole, and the end of the extending column securely engages into the blind hole.

9. The testing module as claimed in claim 7, wherein the head cap is provided with resiliency.

10. The testing module as claimed in claim 6, wherein the cushioning mechanism comprises a first elastic member, a second elastic member, a first sliding column and a second sliding column, the first elastic member coiled around the first sliding column, the second elastic member coiled around the second sliding column.

* * * * *